United States Patent Office 2,962,378
Patented Nov. 29, 1960

2,962,378

ANIMAL FEED COMPOSITION

Charles N. Huhtanen and William L. Williams, New City, N.Y., assignors to American Cyanamid Company, New York, N.Y., a corporation of Maine No Drawing. Filed Feb. 12, 1959, Ser. No. 792,703

8 Claims. (Cl. 99—2)

This invention relates to an improved animal feed and particularly to an improved feed for chicks.

It has been found in the past that when a small amount of a broad spectrum antibiotic of the tetracycline type is added to the feed of animals, improved health and therefore growth results. One of the fields in which the improved results are most striking is in feeds for chickens. The increased growth permits earlier marketing with less total feed consumption and results in very material savings. A similar desirable result is obtained by the addition of tetracycline antibiotics to other animal feeds. The economic savings are less marked as growth period is shorter than with chicks and therefore the savings from more rapid growth are not as high percentage-wise.

Ordinary chick feed requires adequate amounts of calcium, normally from 1% to 1½%, and phosphorus, usually from 0.5% to 0.7% or slightly higher. This creates a problem because in the past the standard sources for calcium and phosphorus, calcium carbonate and calcium hydrogen phosphate or bone meal, markedly lower the blood levels of the tetracycline antibiotics. In general, improvement in health correlates with tetracycline blood levels. As a result, anything which brings about a lowering of the blood level is a serious economic drawback because it requires the addition of more tetracyclines to the feed, a serious economic problem because of the high cost of tetracycline antibiotics.

Attempts have been made to improve blood levels from a given amount of tetracycline antibiotic and one successful result is described in the Kiser Patent 2,806,789. This patent describes the effect of a diet low in calcium and phosphorus. When the amount of calcium is well below 1% in the feed, that is to say when smaller amounts of calcium carbonate or calcium phosphate are used, very substantial increases in blood level of the tetracycline antibiotics result and so less tetracycline may be added to the feeds. At the same time, no other chemicals are added so there is no problem of changing feeds prior to slaughtering to prevent accumulation of other chemicals in the flesh of the animal, and particularly chickens.

However, the solution presented by the Kiser patent does have certain drawbacks. The amount of calcium is very low and in some cases may prove to be too low for continuous feeding. It is, of course, possible to feed the low calcium diet for a few days to build up a good blood level of the tetracyclines and then interrupt it, feeding larger amounts of calcium and phosphorus for a short while. This, however, is not a completely satisfactory solution because it is necessary to have different feeds, whereas the average poultry raiser prefers to use a single feed. Also, it requires rather careful control so that the calcium intake does not become too low or remain too low for too long a time. The raising of poultry particularly, and to a lesser extent the raising of other animals, requires a very efficient use of labor in order to reduce the labor cost and so any increase in the preciseness of control of feeding may involve added costs.

Another approach to the problem of higher tetracycline antibiotic blood levels is described in the recently issued patent to Kent, No. 2,855,340. This approach is quite different. Instead of reducing the calcium intake as is done in the Kiser patent, there is added an additional chemical, terephthalic acid, which gives tetracycline antibiotic blood levels with ordinary calcium and phosphorus diets, roughly comparable to those obtained with the low calcium diet of the Kiser patent. In some respects, this solution has advantages in that a feed of normal calcium and phosphorus content can be used and therefore in the initial or early growing periods, it is not necessary to change feeds. However, this advantage is obtained only at high costs because it is necessary to use relatively large amounts of terephthalic acid, for example 6 to 10 pounds per ton of feed. This greatly increases the cost of the feed and while in some instances it represents a net saving in that the added cost of the chemical may be somewhat more than offset by reduction in the amount of tetracycline antibiotic needed, the savings are much less than with the low calcium diet of the Kiser patent where no added chemicals are needed. Since the presence of terephthalic acid has not been proven to be nontoxic in the flesh of the animal or bird and so has not yet been approved for human consumption, feeds to which terephthalic acid has been added may have to be discontinued for a period immediately prior to slaughter. Thus, a change in feed would be necessary, at least during this period.

The present invention obtains blood levels of tetracycline antibiotic comparable to those obtained either with the low calcium diet of the Kiser patent or the feed containing terephthalic acid of the Kent patent without any additional chemical additive and with a diet having a full normal amount of calcium and phosphorus. The invention is based on the surprising discovery that the adverse effects of a normal calcium diet on tetracycline antibiotic blood levels are not due solely to the presence of calcium but rather to the form in which the calcium is present. Thus, the deleterious effects are noted when calcium carbonate is used, the standard source of calcium, and when the phosphorus source is a calcium phosphate, such as calcium hydrogen phosphate. With exactly the same total amount of calcium and phosphorus, much higher blood levels are obtained, comparable to those obtained by a low calcium diet or by the addition of terephthalic acid, when calcium sulfate is used as a source of calcium and when the phosphorus source itself does not contain a compound of calcium. The mechanism by which this surprising result is obtained is not understood. It seems probable that it is not a straight question of pH because other neutral salts of calcium, such as calcium chloride, are no better than the somewhat basic calcium carbonate or other calcium oxide. Calcium sulfate is the only cheap source of calcium that is free from the deleterious effect of lowering tetracycline antibiotic blood levels. It seems reasonable, therefore, to assume that probably the anion of the calcium salt plays some, as yet unknown, part in the improved results of the present invention. Just what this mechanism is is not known and it is not intended to limit the invention to any particular theory.

Calcium in the phosphorus source appears also to be of importance because calcium phosphates exert a deleterious effect. The effect is, if anything, more marked with calcium carbonate. In the case of the phosphorus source, however, it is sufficient that calcium be absent and it is not necessary that there be a particular cation.

Thus, the excellent results of the present invention are obtained if the phosphorus source is ortho-phosphoric acid or if it is an alkali metal phosphate, such as sodium dihydrogen phosphate, disodium hydrogen phosphate or even trisodium phosphate. The potassium phosphates are also useable. The fact that the last one is effective is further indication that the present invention does not operate by reason of a different degree of alkalinity because trisodium phosphate is much more alkaline than is calcium carbonate. Again, in the phosphorus source it is not known just how the present invention operates and it is not intended to limit the invention to any particular theory.

As far as the tetracycline antibiotics are concerned, the present invention may use any of these known broad spectrum antibiotics. From the standpoint of price and activity, chlortetracycline presents advantages and may be considered as the preferred tetracycline antibiotic of the present invention. However, in its broader aspects, the invention is in no sense limited to feeds containing chlortetracycline and includes the other tetracycline antibiotics, such as tetracycline, oxytetracycline, various 6-dimethyl tetracyclines, etc.

While it is an advantage of the present invention that when calcium sulfate replaces calcium carbonate and the phosphorus source is substantially calcium free, tetracycline antibiotic blood levels are obtained which are comparable, and in some cases even better, than those obtained when terephthalic acid is used with the standard feeds containing calcium carbonate.

It is not intended to limit the invention to the exclusion of terephthalic acid. Thus, where the economics are favorable, the present invention may be used together with terephthalic acid in the feed to obtain still higher blood levels. The relative increase of blood levels by means of terephthalic acid is not substantially changed by the present invention. In other words, terephthalic acid in many cases gives a blood level something over twice that of controls and a gain of the same order of magnitude is obtained when terephthalic acid is added to feeds having the calcium sulfate of the present invention. In general, the increase, however, is not quite as great percentage-wise as when terephthalic acid is added to feeds which contain calcium carbonate, where the increase sometimes is as high as three times. When terephthalic acid is added to the feeds of the present invention, the increase of blood level is more nearly double. However, the fact that an increase with terephthalic acid is still obtainable with calcium sulfate feeds constitutes an additional advantage. The possibility exists of obtaining still higher blood levels and hence permitting the use of still lower amounts of tetracycline antibiotics where the other drawbacks to the chemical addition are more than offset by economic savings. It is a further advantage of the present invention that increased blood levels are obtainable not only by the addition of terephthalic acid, which is the only thing described in the Kent patent.

The invention will be described in greater detail in conjunction with the following specific examples.

EXAMPLE 1

A standard low calcium diet, which will be used in all of the following examples, is prepared as follows:

|  | Percent |
|---|---|
| Corn yellow | 65 |
| Soybean meal | 20 |
| Corn gluten meal | 5 |
| Fish meal | 2 |
| Distillers solubles | 2.5 |
| Sodium chloride | 0.5 |
| Choline chloride | 0.1 |
| Fortafeed 2–49C (source of riboflavin, niacin and pantothenic acid) | 0.1 |
| Vitamin $B_{12}$ supplement to furnish 20 mg. of $B_{12}$ per ton of feed | 0.1 |
| Calcium content | 0.4 |
| Phosphorus content | 0.5 |

This diet was then supplemented with 200 parts per million of chlortetracycline hydrochloride and various calcium sources and in some cases also with terephthalic acid.

The diet was fed to groups of 12 one-day old chicks for 25 days. The chicks were bled at 15 and 25 day intervals and the chlortetracycline level in the blood serum determined. In each case, 6 chicks were bled. The results of the experiment are shown in the following table:

Table 1

| Supplement per Kg. of Diet | | | | | CTC Serum Levels | |
|---|---|---|---|---|---|---|
| $CaCO_3$, gm. | $CaSO_4$, gm. | $H_3PO_4$, gm. | $CaHPO_4 \cdot 2H_2O$, gm. | TPA gm. | 15 day, γ/ml. | 25 day, γ/ml. |
| 18.3 | | 6.6 | | | 0.31 | 0.17 |
| 18.3 | | 6.6 | | 5 | 0.70 | 0.47 |
| 11.6 | | | 10 | | 0.30 | 0.20 |
| 11.6 | | | 10 | 5 | 0.54 | 0.56 |
| | 24 | 6.6 | | | 0.51 | 0.44 |
| | 24 | 6.6 | | 5 | 1.07 | 0.95 |
| | 15 | | 10 | | 0.28 | 0.27 |
| | 15 | | 10 | 5 | 0.69 | 0.62 |

Calcium sources add 0.7% calcium.
Phosphorus sources add 0.2% phosphorus.

It will be noted that in each case, the calcium sources add up to 0.7% calcium and the phosphorus sources to 0.2% phosphorus. This with the calcium and phosphorus content of the basic diet give an amount of calcium and phosphorus which is satisfactory for growing chicks. In the table, the abbreviation "TPA" is used for terephthalic acid and "CTC" for chlortetracycline. These abbreviations will be used also in the succeeding examples.

Replacement of calcium carbonate by calcium sulfate gives a marked rise in blood level at 15 days as compared with calcium carbonate and more than double at the 25 day point. The increase in 25 days is of the same order of magnitude as can be obtained with terephthalic acid alone. It will also be noted that the deleterious effect of calcium hydrogen phosphate is about as marked as that of calcium carbonate. It will also be noticed that when terephthalic acid is added to the feed of the present invention containing calcium sulfate and phosphoric acid, the blood levels are about double which is a somewhat smaller percentage increase than in the case of adding terephthalic acid to the feeds containing calcium carbonate and phosphoric acid.

EXAMPLE 2

Two experiments were run with groups of six 4 week old chicks using the low calcium phosphorus diet supplemented by various sources of calcium and phosphorus. The results appear in the following Table 2:

Table 2

| Source of Calcium | Source of Phosphorus | CTC Levels, mcg./ml. | | | |
|---|---|---|---|---|---|
| | | Exp. 1 | Exp. 2 | TPA, 0.5% | |
| | | | | Exp. 1 | Exp. 2 |
| CaSO₄ | | 0.26 | 0.28 | 0.64 | 0.66 |
| CaSO₄ | H₃PO₄ | 0.35 | 0.35 | 0.70 | 0.62 |
| CaSO₄ | CaHPO₄ | 0.19 | 0.17 | 0.42 | 0.23 |
| CaCO₃ | | 0.13 | 0.19 | 0.35 | 0.36 |
| CaCO₃ | H₃PO₄ | 0.07 | 0.12 | 0.26 | |
| CaCO₃ | CaHPO₄ | 0.09 | 0.09 | 0.20 | 0.23 |

In each experiment, part of the chicks were fed the same feed with an additional 0.5% of terephthalic acid.

It will be noted that the results are comparable to those in the first example and show that the results are in general reproducible, subject of course to the variations of any biological test.

EXAMPLE 3

Chicks 27 days old were placed on the low calcium diet of Example 1, supplemented with various sources of phosphorus. The diet was maintained for three days and then 6 chicks per group were bled and the CTC serum levels determined. Table 3 shows the average results obtained. The amount of calcium sulfate and phosphorus source added gives a total of 1% additional calcium and 0.2% phosphorus.

Table 3

| Source of Phosphorus | CTC, γ/ml. |
|---|---|
| H₃PO₄ | 0.22 |
| NaH₂PO₄·H₂O | 0.28 |
| Na₂HPO₄ | 0.21 |
| Na₃HPO₄·12H₂O | 0.23 |
| CaHPO₄ | 0.13 |

It will be noticed that while phosphoric acid and the various sodium phosphates gave substantially similar blood levels, calcium hydrogen phosphate was markedly inferior.

EXAMPLE 4

Groups of six 27 day old chicks were placed on the diet of Example 1 with various calcium and phosphorus supplements. There were used in each case two different kinds of tetracycline antibiotics, CTC and tetracycline (abbreviated TC). The results appear in Table 4:

Table 4

| Supplement to Low Calcium Diet | Blood Levels | |
|---|---|---|
| | CTC, γ/ml. | TC, γ/ml. |
| None | 0.38 | 0.30 |
| CaCO₃+CaHPO₄·2H₂O | 0.15 | 0.14 |
| CaSO₄·2H₂O+H₃PO₄ | 0.30 | 0.33 |

EXAMPLE 5

Twenty-five day old chicks were placed on the diet of Example 1 with various calcium and phosphorus supplements. Before supplementation, the diet contained 0.4% calcium and 0.5% phosphorus. Some of the chicks received the unsupplemented diet. Others received a diet to which 21 grams per kilo of calcium sulfate in the form of gypsum and 8 grams per kilo of sodium dihydrogen phosphate were added. Still other chicks received a diet to which 13.9 grams per kilo of calcium carbonate and 11.7 grams of dicalcium phosphate (CaHPO₄·2H₂O) were added. Two antibiotics were used, one with each of the three feeds referred to above. One antibiotic was CTC and the other oxytetracycline (abbreviated OTC). The results appear in the following Table 5:

Table 5

| Supplements to Low Calcium Diet | Blood Levels | |
|---|---|---|
| | CTC, γ/ml. | OTC, γ/ml. |
| None | 0.40 | 0.52 |
| CaCO₃+CaHPO₄·2H₂O | 0.15 | 0.26 |
| CaSO₄·2H₂O+NaH₂PO₄ | 0.30 | 0.36 |

We claim:
1. An animal feed composition comprising a nutritionally-balanced diet containing calcium sulfate as the sole source of calcium, a tetracycline antibiotic, and a source of phosphorus consisting essentially of a phosphoric acid compound substantially free from calcium.
2. An animal feed composition according to claim 1 in which the antibiotic is chlortetracycline.
3. An animal feed composition according to claim 1 in which the source of phosphorus is ortho-phosphoric acid.
4. An animal feed composition according to claim 3 in which the tetracycline antibiotic is chlortetracycline.
5. An animal feed composition according to claim 1 in which the source of phosphorus is an alkali metal orthophosphate.
6. An animal feed composition according to claim 5 in which the tetracycline antibiotic is chlortetracycline.
7. An animal feed composition according to claim 1 in which the antibiotic is tetracycline.
8. An animal feed composition according to claim 1 in which the antibiotic is oxytetracycline.

No references cited.